(12) United States Patent
Weseloh

(10) Patent No.: US 7,555,782 B2
(45) Date of Patent: Jun. 30, 2009

(54) ARRANGEMENT AND METHOD FOR LIMITING ACCESS TO ACCESS-PROTECTED DATA IN A SYSTEM DURING REMOTE SERVICING THEREOF

(75) Inventor: Dirk Weseloh, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 826 days.

(21) Appl. No.: 10/964,285

(22) Filed: Oct. 13, 2004

(65) Prior Publication Data

US 2005/0125675 A1 Jun. 9, 2005

(30) Foreign Application Priority Data

Oct. 13, 2003 (DE) ................................ 103 47 431

(51) Int. Cl.
*H04L 9/00* (2006.01)
(52) U.S. Cl. ........................................................ 726/27
(58) Field of Classification Search .................... 726/21
See application file for complete search history.

(56) References Cited

U.S. PATENT DOCUMENTS 6,823,291 B2 * 11/2004 Marsland .................... 702/188

| | | | |
|---|---|---|---|
| 2002/0032762 A1 * | 3/2002 | Price et al. | 709/223 |
| 2002/0173991 A1 * | 11/2002 | Avitall | 705/2 |
| 2003/0233583 A1 * | 12/2003 | Carley | 713/201 |
| 2004/0133625 A1 * | 7/2004 | Plessmann | 709/200 |
| 2004/0255004 A1 | 12/2004 | Weseloh | |
| 2005/0043964 A1 | 2/2005 | Thielscher et al. | |
| 2005/0108577 A1 * | 5/2005 | Nishihata et al. | 713/201 |

FOREIGN PATENT DOCUMENTS

| DE | 198 02 931 | 6/1999 |
|---|---|---|
| EP | 1 075 748 | 5/2005 |
| WO | WO 03/075531 | 9/2003 |
| WO | WO 03/079702 | 9/2003 |

* cited by examiner

*Primary Examiner*—Matthew B Smithers
(74) *Attorney, Agent, or Firm*—Schiff Hardin LLP

(57) ABSTRACT

In an arrangement allowing remote maintenance of a computer-controlled system to be serviced, in particular a medical system, the maintenance occurs via a spatially independent monitoring system in communication with the system to be serviced. The system to be serviced is, among other things, designed for the processing of access-protected data such as, for example, patient data. Access to the access-protected data by the monitoring ensues exclusively via an authorization unit associated with the system to be serviced.

27 Claims, 1 Drawing Sheet

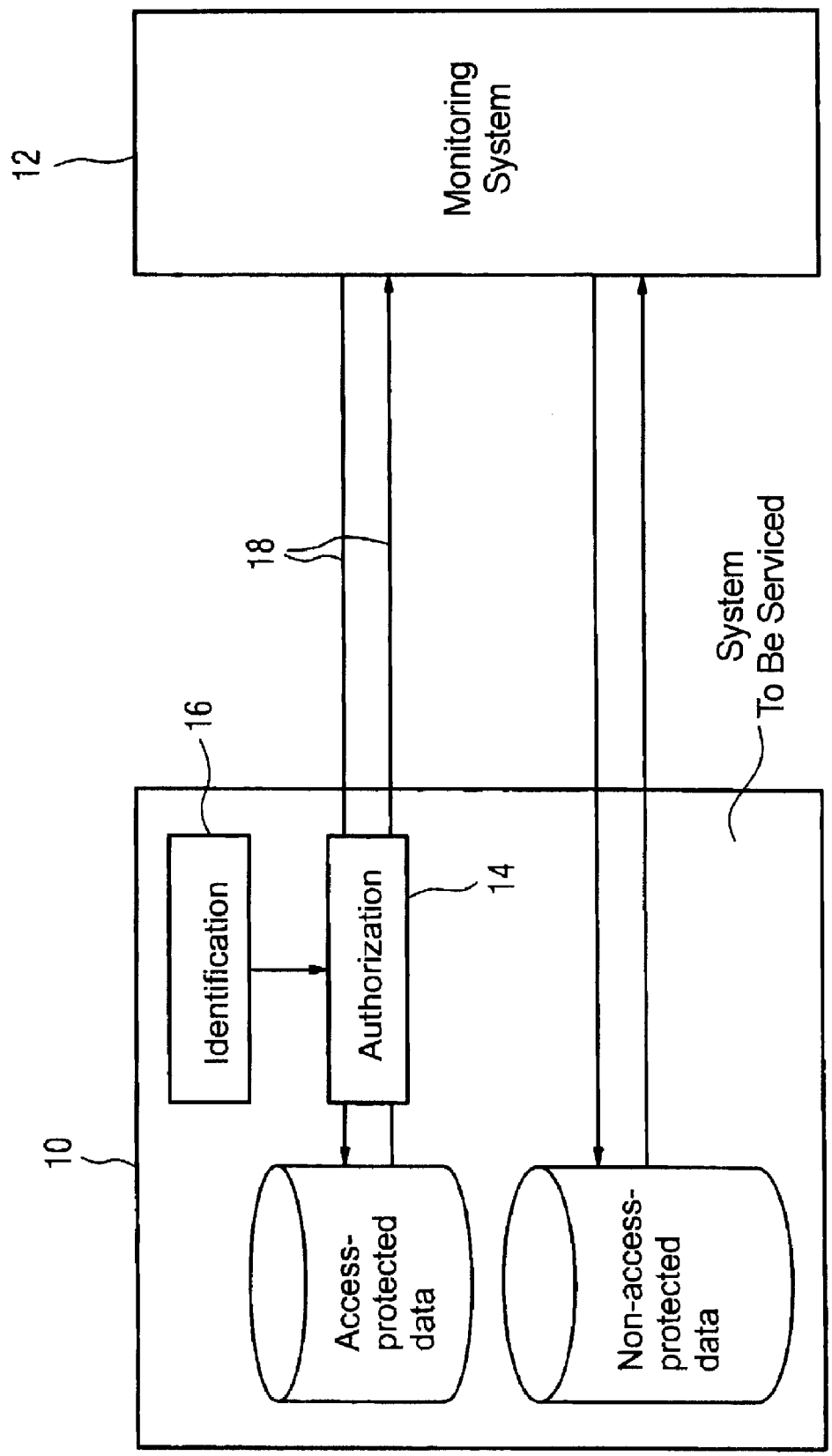

ARRANGEMENT AND METHOD FOR LIMITING ACCESS TO ACCESS-PROTECTED DATA IN A SYSTEM DURING REMOTE SERVICING THEREOF

BACKGROUND OF THE INVENTION

1. Field of the Invention

The present invention concerns the administration, monitoring, repair and/or the servicing of a computer-controlled system maintained with remote system that is in communication with the system to be maintained. The system to be maintained is, among other things designed for processing of access-protected data.

2. Description of the Prior Art

Primary application fields for the above type of system are medical systems that process data under data protection such as, for example, patient data. Other application fields also are, for example, judicial systems, and access-protected client data or software systems in banking that administer or process client data.

In such systems, the problem generally exists that the securing measures inside the system that securely prevent unauthorized access to these data from outside, must be maintained. Given maintenance, access to the system, which naturally must be access to the complete system, necessarily ensues from outside. A security breach is thereby created since, for example, the service technician could retrieve all or specific patient data in the scope of his or her maintenance activity.

This problem has conventionally been addressed by the use of a so-called four-eyes principle. The four-eyes principle assumes that both an authorized employee of the system to be accessed and a service technician are present on site. All actions, in particular accesses, of the service technician are monitored by the employee. He the employee limit or prevent unwanted or unauthorized accesses, if necessary manually and on a case by-case basis.

This procedure has the disadvantage that the presence of at least two people is always necessary; the authorized employee of the system to be serviced and the service technician. Remote maintenance of the system thus has not been possible, or possible only with clear and unacceptable security losses.

Furthermore, with the conventional procedure it was necessary that each individual action of the service technician would have to be individually, and case-specifically, evaluated with regard to its security risk. This manual procedure runs the risk of an access being wrongly assessed as unremarkable although may allow it, perhaps indirectly, access to protected data. This manual determination of actions that need authorization and those that are unproblematical is error-prone. It is therefore desirable to provide a system in which the determination of the actions needing authorization ensues or can ensue in the preliminary stage and in which, on the other hand, the determination of the actions needing authorization ensues automatically.

Furthermore, the conventional procedure has the disadvantage that a very high attentiveness, both on the part of the service technician but primarily on the part of the employee, is demanded since the employee must track nearly every step of the service technician. Since the latter Is, however, for the most part superior to the normal user of the system with regard to computer or system-related capability, this supervision or monitoring was only possible in a very limited manner. It is generally an admitted fact that the purely passive monitoring of the work of another person is a very tirlng job and requires a high degree of concentration. This fact also presents a high security risk. A short, inadvertent glance to the side by the employee is sufficient for the service technician to be able to transfer unnoticed data to a foreign system. A security risk thus existed in previous systems.

SUMMARY OF THE INVENTION

An object of the present invention is to provide a method and system with which security risks of the type described above can be prevented and that are enabled with a remote maintenance.

This object is in accordance with the invention by a method for remote maintenance and/or monitoring of a system to be serviced that at least partially accesses access-protected data with the aid of a monitoring system that is in a data exchange with the system to be serviced, wherein the system to be serviced and/or the monitoring system are/is computer-controlled, and wherein at least one access to access-protected data of the system to be serviced ensues, at least on the part of the monitoring system, exclusively after authorization by an authorization entity.

With the feature that either both systems are directly computer-controlled and/or that one of the two or both are indirectly computer-controlled, by means of an interface allowing connection to a computer, the significant advantage exists that the monitoring system can be spatially separated from the system to be serviced, such that remote maintenance is enabled but is not necessary.

In the maintenance of systems that access access-protected data and/or process there, in general the difficulty exists to determine without error which actions need authorization on the part of the monitoring system and which do not. In principle, all the actions that directly or indirectly access access-protected data of the system to be serviced need authorization. In contrast, actions that, for example, only load a new release of a software module do not need authorization and can therewith ensue faster without an additional supervision. A significant level of knowledge and experience is needed for the determination or establishing of the actions needing authorization and the actions not needing authorization. This determination advantageously, automatically ensues according to an alternative embodiment of the invention. The security is thereby significantly increased upon maintenance, by errors being prevented by means of error association.

In the preferred embodiment of the invention, this determination is executed not automatically but case-specifically. An authorized employee of the system to be serviced is inventively placed in the position to track all actions of the service technician on the side of the monitoring system. The employee therefore has supervision of all actions that are effected on the system to be monitored and can, if necessary, limit or even prevent these actions.

In accordance with the invention this manual preferably is achieved via a synchronization of the screen displays of the system to be serviced and the monitoring system. All actions of the service technician on the monitoring system thus can be followed and authorized by the employee. In the event that an intensive involvement of the employee with the system to be monitored is desired, such that the employee is more significantly incorporated into the process of the service technician or of the monitoring system, it can be desirable that not only the screen contents are synchronized, but also that a synchronization of associated processes ensues.

Should the invention be used, for example, for error recovery of a databank system with data at least partially under data protection, the error recovery measures to be executed by the service technician are executed in parallel on the monitoring system and on the system to be serviced. In particular, such measures that have side effects on the system must then be authorized by the employee. In an alternative solution according to the invention, both the synchronization of screen contents and of associated processes between the system to be serviced and the monitoring system is provided. For the most part, the latter solution used in complex systems in which the maintenance of the system requires the interaction between employee (or system engineer) and service technician. In contrast, in pure application systems that require a typical maintenance expenditure, only the screen contents are synchronized on both sides. The speed of the remote maintenance system can therewith be increased.

Alternatively or in addition to the synchronization just described, the authorization can ensue in accordance with the invention with the aid of an online protocol. The online protocol inventively displays each process of the monitoring system or shows at least the processes that are executed or should be executed with regard to the access protected data of the system to be serviced. Thus the employee not only can monitor and evaluate the planned access of the service technician in advance but also all operations of the service technician that have been executed in the framework of the remote maintenance can be retraced after the event. This can be used for assessment of the quality of the remote maintenance and can be useful for subsequent remote maintenance for which the service technician would like to procure information about one of the preceding maintenance sessions.

The authorization preferably ensues manually via a mouse click or the operation of a button of a computer. It is also within the scope of the invention for the authorization to ensue via a special device, with a switch of this device being activated or operated by an authorized employee of the system to be serviced. The advantage of additional supervision is associated with such manual authorization, since every step or, respectively, access of the service technician must truly be considered and approved.

In an alternative embodiment of the invention, the authorization is at least partially automated. After a division of all data of the system to be monitored into data needing authorization and data not needing authorization, all data needing authorization are characterized with an indication, for example with a flag. The characterized data are divided into classes or data structures. If one class of a characterized data needing authorization is now authorized once within a maintenance process, this is noted within the system. Later access of the monitoring system to this data class therefore does not have to ensue again in the same maintenance process. The processing time of the system and the user-friendliness can be increased in this manner. This feature is provided as a default in this embodiment, such that semi-automation of the authorization can be selectively adjusted.

In the preferred embodiment of the invention, the authorization ensues separately for each access-protected data packet to be transferred individually and independently of one another. The security of the remote maintenance system is thereby increased. If, however, it is not necessary for the maintenance system to effect changes to a packet of access-protected data sets or in a specific data structure of the system to be serviced, in a further alternative embodiment of the invention the authorization does not ensue separately for each individual access, but rather is combined for a number of access-protected data packets to be transferred. The processing time of the remote maintenance system thus can be increased.

In order to prevent a service technician from obtaining unauthorized access to protected data of the system to be maintained, in accordance with the invention the maintenance is cancelled, or at least selectively limited, given a lack of authorization after a predeterminable number of access attempts. This gives the employee of the system to be serviced an additional supervision possibility.

The authorization entity can be associated with the system to be serviced. This allows the criteria for the authorization to be adaptively and situationally modifiable from maintenance process-to-maintenance process, and to be established within the system to be serviced.

The inventive method preferably includes the additional step of identification of the authorization entity within the system to be serviced. The identification can be achieved with an identification unit that is preferably a system employing storage chip cards and an associated reader. The employee can identify himself or herself via the reading of the employee, card data and subsequently authorize specific accesses to data. An additional level of security is thereby achieved, since the service technician is precluded from authorizing himself or herself at the monitoring system. It is thus ensured that the authorization entity is always identified, at or by the system to be serviced, by an employee before beginning the maintenance process.

A preferred embodiment of the invention has two computer-controlled systems. A determination of actions needing authorization ensues automatically. It is checked whether the respective action of the monitoring system requires access to access-protected data of the system to be serviced. If so, the action is specified as needing authorization, otherwise it is specified as not needing authorization. This determination automatically ensues, according to an embodiment of the invention, by the system to be serviced. This has the advantage that an error due to human oversight can be precluded.

The inventive embodiments of the method described above can be fashioned as a computer program product stored on a medium readable by a computer, in computer program code, and with which the computer is controlled to implement the inventive method described above after loading of the computer program.

DESCRIPTION OF THE DRAWINGS

The single FIGURE is a schematic overview of the basic components of a remote maintenance system constructed and operating in accordance with the invention.

DESCRIPTION OF THE PREFERRED EMBODIMENTS

As an overview, FIG. 1 shows a number of basic components of the present invention. A system to be serviced 10 is designed for interaction with a monitoring system 12. The monitoring system 12 is designed for maintenance, system care and/or for monitoring of the system 10 to be serviced.

The system 10 to be serviced processes, among other things, data under access protection. The access-protected data should be protected from an unauthorized access through the monitoring system 12 in the context of servicing. The system 10 to be serviced therefore has an authorization unit 14 that is designed for supervision and authorization of accesses by the monitoring system 12.

The system 10 to be serviced furthermore has an identification unit 16 that provided an identification to the authorization unit 14 in order to prevent an unauthorized access via an unwarranted authorization.

The system 10 to be serviced and the monitoring system 12 communicate via a data link 18.

The data link 18 can be a cable or a fixed network connection or a wireless link such as a radio connection, for example a Bluetooth interface, or other types of wireless links for data transmission. Furthermore, depending on the embodiment the data link 18 can be persistent or a sporadically activated communication connection or interface. The use of a communication connection over the Internet has proven to be particularly advantageous, since the site of the service technician or the monitoring system 12 then is insignificant for the maintenance. A further degree of freedom thus can be achieved for the maintenance.

The identification unit 16 preferably is a chip card with an associated reader. With his chip card, an employee of the system 10 to be serviced can log into the system 10 to be serviced and can identify himself or herself via the stored card data. If the identification is successfully concluded, this employee can indirectly follow the steps of the service technician at the monitoring system 12. The steps are displayed to the employee by the authorization unit 14 and the access that must ensue to access-protected data sets requires the authorization by the identified employee of the system 10 to be serviced. The authorization can ensue via display of the planned access or the planned accesses, and by a subsequent operation of the return key or a mouse click.

Unmonitored or unsupervised access to the access-protected data of the system 10 monitored by the monitoring system 12 is thereby precluded. Access to this data ensues only via the intermediate authorization unit 14.

Remote maintenance is possible through the provision of the data link 18 and the provision of a software module that also makes the activities by the service technician at the monitoring system 12 transparent and traceable. The necessity that was previously existed with systems according to the prior art, namely that the service technician be on site and present together with an employee of the system 10 to be serviced, thus does not exist in the inventive system and method.

In an alternative embodiment, the identification unit 16 is not directly or immediately associated with the system 10 to be serviced, but instead is associated with a higher-ranking entity in a hierarchical system that includes the system 10. This enables the same employee to monitor various maintenance processes occurring in parallel in an organization, for example in a business, which reduces the overall personnel expenditure and therefore contributes to cost savings.

In complex systems that have a number of data-related units and organized in a network, it can be necessary that, a number of monitoring systems 12 be provided and/or a number of systems 10 to be serviced exist within a hierarchy. In these cases, preferably only one authorization unit 14 and one identification unit 16 are provided in order to prevent data-related redundancies. In alternative embodiments, however, an authorization unit 14 and/or an identification unit 16 can be specified for each system 10 to be serviced.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for monitoring a system to be serviced comprising the steps of:

placing a computerized system to be serviced, which contains access-protected data, in communication with a computerized monitoring system, for servicing said system to be serviced remotely from said system to be serviced;

organizing said access-protected data into a plurality of classes, each class containing different access-protected data;

associating an authorization unit with said system to be serviced, through which communication by said monitoring system must proceed from said monitoring system to access said access-protected data and through said authorization unit, collectively authorizing access to all access-protected data in said class ensues only once; and allowing access by said monitoring system to said access-protected data only after authorization by said authorization unit.

2. A method as claimed in claim 1 wherein said system to be serviced and said monitoring system have respective screen displays, and comprising authorizing said access to said access-protected data by synchronizing the respective screen displays of said system to be serviced and said monitoring system.

3. A method as claimed in claim 1 wherein, during servicing of said system to be serviced, said system to be serviced and said monitoring system proceed through respective servicing processes and comprising authorizing said access to mid access-protected data by synchronizing the respective servicing processes of said system to be serviced and said monitoring system.

4. A method claimed in claim 1 comprising authorizing said access to said access-protected data by executing an online protocol that displays every process of said monitoring system during servicing of said system to be serviced.

5. A method claimed in claim 1 comprising authorizing said access to said access-protected date by executing an online protocol that displays every process of said monitoring system requiring access to said access-protected data during servicing of said system to be serviced.

6. A method as claimed in claim 1 comprising manually authorizing said access to said access-protected data via said authorization unit.

7. A method as claimed in claim 1 comprising electronically authorizing said access to said access-protected data from a computer connected to said authorization unit.

8. A method as claimed in claim 1 comprising automatically electronically identifying servicing actions needing said authorization and servicing actions not needing said authorization, and reviewing only said servicing actions needing authorization for determining whether to authorize said access to said access-protected data.

9. A method as claimed in claim 1 wherein said access-protected data comprise a plurality of access-protected data packets, and wherein the step of authorizing access to said access-protected data comprises separately authorizing access to each of said access-protected data packets.

10. A method as claimed in claim 1 comprising cancelling said servicing of said system to be serviced after authorization is denied for a predetermined number of attempts to access said access protected data.

11. A method as claimed in claim 1 comprising physically connecting said authorization unit to said system to be serviced.

12. A method as claimed in claim 1 comprising the additional step of entering an identification of an authorization entity into said authorization unit, and approving said identification of said authorization entity prior to authorizing said access to said access-protected data.

13. An arrangement for monitoring a system to be serviced comprising:
- a computerized system to be serviced that contains access-protected data stored therein organized in a plurality of classes that respectively contain different access-protected data;
- a computerized monitoring system, configured to service said system to be serviced, remote from and in communication with said system to be serviced; and
- an authorization unit associated with said system to be serviced, through which communication by said monitoring system must proceed from said monitoring system to access said access-protected data, said authorization unit being configured to collectively authorized access to all access protected data in a class so that access to all access-protected data in said class ensues only once, and to allow access by said monitoring system to said access-protected data only after authorization by said authorization unit.

14. An arrangement as claimed in claim 13 wherein said system to be serviced and said monitoring system have respective screen displays, and wherein said authorization unit is configured to authorize said access to said access-protected data by synchronizing the respective screen displays of said system to be serviced and said monitoring system.

15. An arrangement as claimed in claim 13 wherein, during servicing of said system to be serviced, said system to be serviced and said monitoring system proceed through respective servicing processes and wherein said authorization unit is configured to authorize said access to said access-protected data by synchronizing the respective servicing processes of said system to be serviced and said monitoring system.

16. An arrangement as claimed in claim 13 wherein said authorization unit authorizes is configured to authorize said access to said access-protected data by executing an online protocol that displays every process of said monitoring system during servicing of said system to be serviced.

17. An arrangement as claimed in claim 13 wherein said authorization unit is configured to authorize said access to said access-protected data by executing an online protocol that displays every process of said monitoring system requiring access to said access-protected data during servicing of said system to be serviced.

18. An arrangement as claimed in claim 13 wherein said authorization unit is configured to allow manual authorization of said access to said access-protected data via said authorization unit.

19. An arrangement as claimed in claim 13 wherein said authorization unit is configured to allow electronic authorization of said access to said access-protected data from a computer connected to said authorization unit.

20. An arrangement as claimed in claim 13 wherein said system to be serviced is configured to automatically electronically identify servicing needing said authorization and servicing actions not needing said authorization, and wherein said authorization unit is configured to review only said servicing actions needing authorization for determining whether to authorize said access to said access-protected data.

21. An arrangement as claimed in claim 13 wherein said access-protected data are stored as a plurality of access-protected data packets respectively representing said classes, and wherein said authorization unit is configured to authorize access to said access-protected data by separately authorizing access to each of said access-protected data packets.

22. An arrangement as claimed in claim 13 wherein said authorization unit is configured to cancel said servicing of said system to be serviced after authorization is denied for a predetermined number of attempts to access said access protected data.

23. An arrangement as claimed in claim 13 comprising a physical communication connection between said authorization unit and said system to be serviced.

24. An arrangement as claimed in claim 13 wherein said authorization unit is configured to allow entry of an identification of an authorization entity into said authorization unit, and to approve said identification of said authorization entity prior to authorizing said access to said access-protected data.

25. An arrangement as claimed in claim 13 wherein said system to be serviced is a medical system containing patient data as said access-protected data.

26. A computer-readable medium encoded with programming instructions for monitoring a system to be serviced, said programming instructions, when executed by a processor, cause the processor to:
- place a computerized system to be serviced in communication with a computerized monitoring system for servicing said system to be serviced remotely from said system to be serviced;
- cause access-protected data to be stored at said computerized system organized into a plurality of classes, each class containing different access-protected data, associate an authorization unit with said system to be serviced, through which communication by said monitoring device must proceed from said monitoring system to access said access-protected data;
- through said authorization unit, collectively authorize access to all access-protected data in a class so that access to all access-protected data in said class ensues only once; and
- allow access by said monitoring system to said access-protected data only after authorization by said authorization unit.

27. A method for monitoring a system to be serviced, comprising the steps of:
- place a computerized system to be serviced in communication with a computerized monitoring system for servicing said system to be serviced remotely from said system to be serviced;
- cause access-protected data to be stored at said computerized system organized into a plurality of classes, each class containing different access-protected data, associate an authorization unit with said system to be serviced, through which communication by said monitoring device must proceed from said monitoring system to access said access-protected data;
- allowing access by said monitoring system to said access-protected data only after authorization by said authorization unit; and
- automatically cancelling said servicing of said system to be serviced if and after authorization is denied for a predetermined number of attempts to access said access-protected data.

* * * * *